United States Patent
Ma et al.

(10) Patent No.: US 12,060,505 B2
(45) Date of Patent: Aug. 13, 2024

(54) DOUBLE COATED TAPE

(71) Applicant: 3M INNOVATIVE PROPERTIES COMPANY, St. Paul, MN (US)

(72) Inventors: Jingjing Ma, Cottage Grove, MN (US); You-Hoon Kim, Woodbury, MN (US); Christopher J. Rother, Hudson, WI (US); Gregory L. Bluem, St. Paul, MN (US); Zhong Chen, Woodbury, MN (US); Sarang V. Deodhar, Woodbury, MN (US); Peter J. Klopp, Lake Elmo, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 478 days.

(21) Appl. No.: 15/547,088

(22) PCT Filed: Feb. 17, 2016

(86) PCT No.: PCT/US2016/018204
§ 371 (c)(1),
(2) Date: Jul. 28, 2017

(87) PCT Pub. No.: WO2016/137793
PCT Pub. Date: Sep. 1, 2016

(65) Prior Publication Data
US 2018/0010018 A1     Jan. 11, 2018

Related U.S. Application Data

(60) Provisional application No. 62/121,967, filed on Feb. 27, 2015.

(51) Int. Cl.
*C09J 7/29*     (2018.01)
*C09J 133/06*   (2006.01)

(52) U.S. Cl.
CPC .............. *C09J 7/29* (2018.01); *C09J 133/06* (2013.01); *C09J 2203/318* (2013.01); *C09J 2301/124* (2020.08); *C09J 2301/162* (2020.08); *C09J 2301/302* (2020.08); *C09J 2407/006* (2013.01); *C09J 2409/006* (2013.01); *C09J 2421/006* (2013.01); *C09J 2423/006* (2013.01); *C09J 2425/006* (2013.01); *C09J 2433/00* (2013.01); *C09J 2475/006* (2013.01); *Y10T 428/24967* (2015.01); *Y10T 428/2843* (2015.01); *Y10T 428/2848* (2015.01)

(58) Field of Classification Search
CPC ....... C09J 7/29; C09J 133/06; C09J 2201/128
See application file for complete search history.

(56) References Cited

U.S. PATENT DOCUMENTS

| | | | |
|---|---|---|---|
| 4,595,738 A | 6/1986 | Hufnagel | |
| 4,780,509 A | 10/1988 | Taubitz | |
| 4,804,481 A | 2/1989 | Lennartz | |
| 4,877,007 A | 10/1989 | Olson | |
| 5,354,597 A * | 10/1994 | Capik | B32B 25/08 428/152 |
| 5,476,712 A * | 12/1995 | Hartman | B29C 44/24 428/317.3 |
| 5,496,615 A * | 3/1996 | Bartlett | C09J 7/38 428/354 |
| 5,516,581 A | 5/1996 | Kreckel | |
| 5,602,221 A | 2/1997 | Bennett | |
| 5,681,612 A | 10/1997 | Benedict | |
| 5,888,594 A | 3/1999 | David | |
| 6,045,895 A | 4/2000 | Hyde | |
| 6,331,336 B1 | 12/2001 | Szonn | |
| 6,436,530 B1 | 8/2002 | Szoon | |
| 6,455,161 B1 * | 9/2002 | Regnier | B32B 27/28 428/412 |
| 6,527,899 B1 | 3/2003 | Dietz | |
| 8,592,035 B2 | 11/2013 | Sakurai | |
| 2004/0086710 A1 | 5/2004 | Pitzen | |
| 2004/0241417 A1 | 12/2004 | Fischer | |
| 2005/0255331 A1 | 11/2005 | Krebs | |
| 2006/0040075 A1 | 2/2006 | Roulin | |
| 2008/0296546 A1 | 12/2008 | Bergendahl | |
| 2009/0091501 A1 | 4/2009 | Mizoroki | |
| 2009/0229732 A1 | 9/2009 | Determan | |
| 2009/0274859 A1 | 11/2009 | Husemann | |
| 2011/0039058 A1 | 2/2011 | Tam | |
| 2011/0126968 A1 | 6/2011 | Determan | |

(Continued)

FOREIGN PATENT DOCUMENTS

| | | |
|---|---|---|
| CN | 202137248 | 2/2012 |
| CN | 102632616 | 8/2012 |

(Continued)

OTHER PUBLICATIONS

Arkema, Pebax, 2 pgs.

(Continued)

*Primary Examiner* — Anish P Desai
(74) *Attorney, Agent, or Firm* — Kathleen B. Gross; Philip Soo

(57) ABSTRACT

Provided are double-coated tapes that include, in the following order: a first pressure-sensitive adhesive layer; a first plastic skin layer; an elastic base layer; a second plastic skin layer; and a second pressure-sensitive adhesive layer. The provided double-coated adhesive tapes can provide a combination of high bond strength, reworkability, and high impact and shock resistance, and can be easily converted using a die cutting process.

19 Claims, 2 Drawing Sheets

(56) References Cited

U.S. PATENT DOCUMENTS

| | | |
|---|---|---|
| 2011/0250375 A1 | 10/2011 | Bries |
| 2011/0253301 A1 | 10/2011 | Yamanaka |
| 2011/0268929 A1 | 11/2011 | Tran |
| 2011/0311792 A1 | 12/2011 | Batra |
| 2013/0033806 A1 | 2/2013 | Rochna |
| 2013/0101819 A1 | 4/2013 | Suzuki |
| 2013/0139953 A1* | 6/2013 | Galush .................. B32B 27/34 156/71 |
| 2014/0065403 A1 | 3/2014 | Higuchi |
| 2014/0134390 A1 | 5/2014 | Voth |
| 2014/0209692 A1 | 7/2014 | Ozaki |
| 2015/0044457 A1 | 2/2015 | Chen |
| 2015/0225614 A1* | 8/2015 | Kim ........................ C09J 7/26 428/317.3 |

FOREIGN PATENT DOCUMENTS

| | | |
|---|---|---|
| CN | 203275057 | 11/2013 |
| CN | 203373308 | 1/2014 |
| CN | 203496277 | 3/2014 |
| DE | 10063018 | 7/2002 |
| DE | 10258670 | 6/2004 |
| EP | 1506984 | 2/2005 |
| EP | 2368604 | 9/2011 |
| JP | S57168975 | 10/1982 |
| JP | S62053389 | 3/1987 |
| JP | S62128740 | 6/1987 |
| JP | 63233823 | 9/1988 |
| JP | 2003-019773 | 1/2003 |
| JP | 2005-111919 | 4/2005 |
| JP | 2010-013648 | 1/2010 |
| JP | 2010-167640 | 8/2010 |
| JP | 2012-167247 | 9/2012 |
| JP | 2013-249367 | 12/2013 |
| WO | WO 1995-32851 | 12/1995 |
| WO | WO 1995/032851 | 12/1995 |
| WO | WO 2013-074446 | 5/2013 |
| WO | WO 2015-013387 | 1/2015 |

OTHER PUBLICATIONS

DuPont Packaging and Industrial Polymers, 2014, 4pgs.
Pocius, Adhesion and Adhesives Technology: an Introduction (1997), 7.
International Search Report for PCT International Application No. PCT/US2016/018204, mailed on May 11, 2016, 5pgs.
Notice of Reasons for Rejection, JP 201744721, dated Dec. 20, 2019 (5 pages).
JP Search Report, JP 201744721, Dec. 17, 2019 (7 pages).

* cited by examiner

DOUBLE COATED TAPE

TECHNICAL FIELD

The present disclosure relates to double-coated tapes. More particularly, the present disclosure relates to double-coated pressure-sensitive adhesive tapes usable, for example, in lens bonding applications for electronic displays.

BACKGROUND

In our digital age, electronic displays are ubiquitous as digital devices have become an integral part of our lives at home and in the workplace. These displays are manifest in a wide variety of products we use every day, including televisions, computer monitors, cellular handsets (e.g., "smart phones"), laptops, tablet computers, and even watches. Portable electronic devices generally use these displays and represent a fast growing area in the consumer electronics market. Many displays are also feature touch-screens that allow a user to provide input to the device through gestures by touching the screen with a stylus and/or one or more fingers.

Because these devices are delicate and also frequently manipulated and touched, manufacturers commonly bond a protective cover window, called a "lens," over the electronic display. This lens is typically constructed of a thin and transparent hard material such as glass or crystalline mineral, to provide scratch-resistance. The lens may also include one or more special coatings on its exposed major surface to repel oils present on one's fingertips. Depending on the application, the lens may be flat or curved.

Customarily, manufacturers bond the lens to the display by attaching its peripheral edges to a frame disposed along the display's surrounding bezel. Advantageously, bonding to the frame can help reduce device thickness and avoid image distortion by allowing most or all of the lens to rest directly on the display.

Coupling the lens to the frame in an efficient, yet robust, manner is not a trivial problem. Current industry solutions include use of a polyethylene terephthalate (PET)-based tapes, acrylic- or polyolefin-based foam tapes, liquid adhesives, and mechanical fixtures, but none has been technically ideal.

SUMMARY

Portable electronic devices, by their nature, are subjected to harsh operating environments. Mobile handsets and tablet computers, in particular, are occasionally jostled or dropped and exposed to wide ranges of temperature and humidity. When tested under these extreme circumstances, existing solutions leave substantial margin for improvement. In particular, many conventional bonding solutions do not provide a high impact resistance and push-out force that allows a portable electronic device to withstand significant drops without detachment of the lens from the frame.

While this problem might be addressed by modifying composition of the tape backing, it was discovered that compositions that yield improved impact resistance were technically challenging to implement because discrete pieces of these materials could not be cleanly cut from a continuous web of material using, for example, die-cutting or similar processes.

Described herein are double-coated adhesive tapes that use a carrier film comprised of a core layer disposed between a pair of plastic skin layers. The carrier film, in turn, is laminated to pressure sensitive adhesive layers on both of its opposing major surfaces. The resulting multilayered configuration provides a high degree of bond strength even when the bonded assembly is subjected to repeated impact or shock testing, and further enables the tape to be easily die cut in a continuous manufacturing process.

In a first aspect, a double-coated tape is provided. The double-coated tape comprises, in the following order: a first pressure-sensitive adhesive layer; a first plastic skin layer; an elastic base layer; a second plastic skin layer; and a second pressure-sensitive adhesive layer, wherein the first pressure-sensitive adhesive layer and the second pressure-sensitive adhesive layer are outermost layers on either side of the double-coated tape.

In a second aspect, a device assembly using the aforementioned double-coated tape is provided, comprising: a lens; and the double-coated tape adhesively coupled to the lens.

In a third aspect, a method of making the aforementioned double-coated tape is provided, comprising: simultaneously extruding first and second plastic skin resins and an elastic base resin through a blown film die to form an extruded tube; slitting the extruded tube to provide a carrier film comprising the first plastic skin layer, elastic base layer, and second plastic film layer; and laminating the first and second pressure-sensitive adhesive layers to opposing major surfaces of the carrier film to provide the double-coated tape.

In a fourth aspect, a method of making the aforementioned double-coated tape is provided, comprising: coextruding first and second plastic skin resins and an elastic base resin through a die to form the carrier film comprising the first plastic skin layer, the elastic base layer, and the second plastic skin layer; and laminating the first and second pressure-sensitive adhesive layers to opposing major surfaces of the carrier film to provide the double-coated tape.

BRIEF DESCRIPTION OF THE DRAWINGS

The disclosure may be more completely understood in consideration of the following detailed description of various embodiments of the disclosure in connection with the accompanying figures, in which.

While the above-identified drawings, which may not be drawn to scale, set forth various embodiments of the present disclosure, other embodiments are also contemplated, as noted in the Detailed Description. In all cases, this disclosure describes the presently disclosed invention by way of representation of exemplary embodiments and not by express limitations. It should be understood that numerous other modifications and embodiments can be devised by those skilled in the art, which fall within the scope and spirit of this disclosure.

DETAILED DESCRIPTION

As used herein, recitation of numerical ranges by endpoints includes all numbers subsumed within that range (e.g. 1 to 5 includes 1, 1.5, 2, 2.75, 3, 3.8, 4, and 5, and the like).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

For the following defined terms, these definitions shall be applied for the entire Specification, including the claims, unless a different definition is provided in the claims or elsewhere in the Specification based upon a specific reference to a modification of a term used in the following Glossary:

Glossary

The words "a", "an", and "the" are used interchangeably with "at least one" to mean one or more of the elements being described.

The term "layer" refers to any material or combination of materials on or overlaying a substrate.

Words of orientation such as "atop, "on," "covering," "uppermost," "overlaying," "underlying" and the like for describing the location of various layers, refer to the relative position of a layer with respect to a horizontally-disposed, upwardly-facing substrate. It is not intended that the substrate, layers or articles encompassing the substrate and layers, should have any particular orientation in space during or after manufacture.

The term "separated by" to describe the position of a layer with respect to another layer and the substrate, or two other layers, means that the described layer is between, but not necessarily contiguous with, the other layer(s) and/or substrate.

The term "(co)polymer" or "(co)polymeric" includes homopolymers and copolymers, as well as homopolymers or copolymers that may be formed in a miscible blend (e.g., by coextrusion), or by reaction (including, e.g., transesterification). The term "copolymer" includes random, block, graft, and star copolymers.

Figure 1:
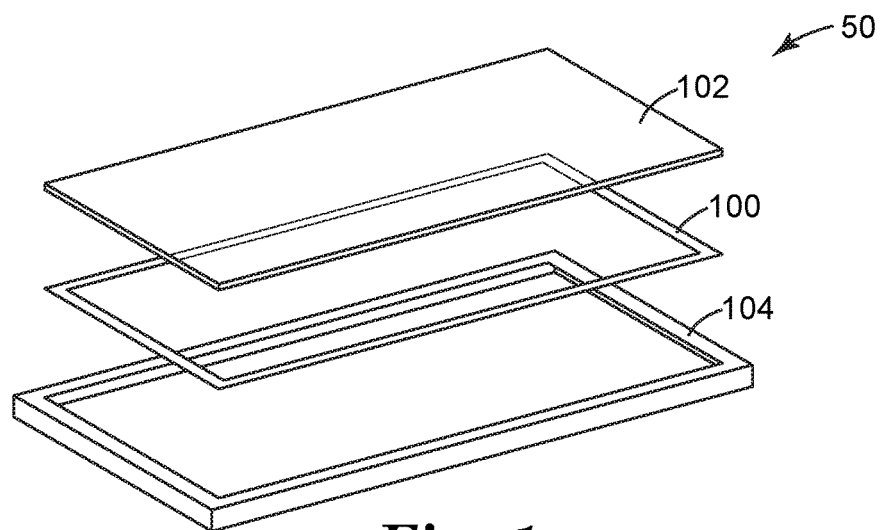
FIG. 1 is an exploded, perspective view of a bonded lens assembly using a double-coated tape of the present disclosure according to one exemplary embodiment.

By way of illustration and example, various embodiments of double-coated pressure-sensitive adhesive tapes are herein presented. FIG. 1 illustrates the use of a double-coated tape in a common consumer product—a cellular phone. As shown in this figure, the cellular phone embodies an exemplary bonded lens assembly, herein designated by the numeral 50.

The bonded lens assembly 50 includes, in the following order, a lens 102, a double-coated tape 100, and substrate 104. The lens 102 is a thin, transparent layer of material, such as a glass, crystal or hard plastic, which is adhesively coupled to the underlying substrate 104 by the tape 100. Optionally and as shown, the tape 100 extends across only the perimeter (or "frame") of the adjacent layers, thereby allowing light generated by the substrate 104 to pass through the lens 102 without interference from the tape 100, which may or may not be transparent.

While the lens 102 and substrate 104 are generically represented, either or both may themselves be multilayered or otherwise have significant complexity.

Figure 2:
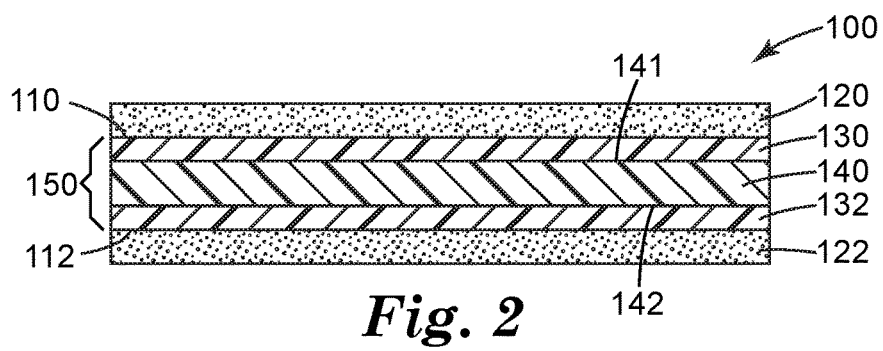
FIG. 2 is a schematic cross-sectional view of the double-coated tape of FIG. 1.

FIG. 2 shows, in isolation, the double-coated tape 100 of the bonded lens assembly 50. The double-coated tape 100 includes a first pressure-sensitive adhesive layer 120 disposed on a first major surface 110 of a carrier film 150, and a second pressure-sensitive adhesive layer 122 disposed on a second major surface 112 (opposite the first major surface 110) of the carrier film 150. The carrier film 150 is multilayered and includes a first plastic skin layer 130 disposed on a first major surface 141 of an elastic base layer 140, and second plastic skin layer 132 disposed on a second major surface 142 (opposite the first major surface 141) of the elastic base layer 140.

The double-coated tape 100 therefore includes, in the following order: the first pressure-sensitive adhesive layer 120, the first plastic skin layer 130, the elastic base layer 140, the second plastic skin layer 132, and the second pressure-sensitive adhesive layer 122.

The pressure-sensitive adhesive layers 120, 122 of the present disclosure are not particularly restricted and may be comprised of any known pressure-sensitive adhesive. Pressure-sensitive adhesives are a distinct category of adhesives and a distinct category of thermoplastics, which in dry (solvent-free) form are aggressively, and permanently, tacky at room temperature. They firmly adhere to a variety of dissimilar surfaces upon mere contact without the need of more than finger or hand pressure. Pressure-sensitive adhesives require no activation by water, solvent, or heat to exert a strong adhesive holding force toward such materials as paper, cellophane, glass, wood, and metals. They are sufficiently cohesive and elastic in nature so that, despite their aggressive tackiness, they can be handled with the fingers and removed from smooth surfaces without leaving a residue. Pressure-sensitive adhesives can be quantitatively described using the "Dahlquist criteria" which maintains that the elastic modulus of these materials is less than $10^6$ dynes/cm$^2$ at room temperature (see, for example, Pocius, A. V., Adhesion & Adhesives: An Introduction, Hanser Publishers, New York, N.Y., First Edition, 1997).

Exemplary pressure-sensitive adhesives useful for the presently disclosed pressure-sensitive adhesive layers 120, 122 include, but are not limited to, acrylic pressure-sensitive adhesives, rubber pressure-sensitive adhesives, rubber-resin pressure-sensitive adhesives, vinyl alkyl ether pressure-sensitive adhesives, silicone pressure-sensitive adhesives, polyester pressure-sensitive adhesives, polyamide pressure-sensitive adhesives, urethane pressure-sensitive adhesives, fluorinated pressure-sensitive adhesives, epoxy pressure-sensitive adhesives, block copolymer-based pressure-sensitive adhesives and other known pressure-sensitive adhesives. In a preferred embodiment, acrylic pressure-sensitive adhesives are used. Each of the different pressure-sensitive adhesives can be used alone or in combination. The particular pressure-sensitive adhesives used are not critical, and examples could include emulsion pressure-sensitive adhesives, solvent-borne pressure-sensitive adhesives, photo-polymerizable pressure-sensitive adhesives and hot melt pressure-sensitive adhesives (i.e., hot melt extruded pressure-sensitive adhesives).

Acrylic pressure-sensitive adhesives include pressure-sensitive adhesives containing an acrylic polymer as a base polymer (or base resin). Though not so limited, the acrylic polymer can be prepared by subjecting to polymerization (or copolymerization) one or more alkyl (meth)acrylates as essential monomer components (main monomer components) and, where necessary, one or more monomers copolymerizable with the alkyl (meth)acrylates. Exemplary copolymerizable monomers include polar-group-containing monomers and multifunctional monomers. The polymerization can be performed, without limitation, according to any technique known in the art, such as ultraviolet polymerization, solution polymerization, or emulsion polymerization.

Alkyl (meth)acrylates for use as main monomer components of the acrylic polymer herein are alkyl (meth)acrylates each having a linear or branched-chain alkyl group, and examples include alkyl (meth)acrylates whose alkyl moiety has 1 to 20 carbon atoms, such as methyl (meth)acrylates, ethyl (meth)acrylates, propyl (meth)acrylates, isopropyl (meth)acrylates, butyl (meth)acrylates, isobutyl (meth)acrylates, s-butyl (meth)acrylates, t-butyl (meth)acrylates, pentyl (meth)acrylates, isopentyl (meth)acrylates, hexyl (meth) acrylates, heptyl (meth)acrylates, octyl (meth) acrylates, 2-ethylhexyl (meth) acrylates, isooctyl (meth)acrylates, nonyl (meth)acrylates, isononyl (meth)acrylates, decyl (meth)acrylates, isodecyl (meth)acrylates, undecyl (meth) acrylates, dodecyl (meth) acrylates, tridecyl (meth) acrylates, tetradecyl (meth) acrylates, pentadecyl (meth) acrylates, hexadecyl (meth)acrylates, heptadecyl (meth) acrylates, octadecyl (meth)acrylates, nonadecyl (meth)acrylates, and eicosyl (meth)acrylates. Among these, alkyl (meth)acrylates whose alkyl moiety has 2 to 14 carbon atoms are preferred, and alkyl (meth)acrylates whose alkyl moiety has 2 to 10 carbon atoms are more preferred.

As a primary monomer component of the acrylic polymer, the amount of alkyl (meth)acrylates is, in some embodiments, 60 percent by weight or more, and in other embodiments 80 percent by weight or more, based on the total amount of monomer components for constituting the acrylic polymer. The acrylic polymer may further contain, as monomer components, one or more copolymerizable monomers such as polar-group-containing monomers and multifunctional monomers. The presence of copolymerizable monomers as monomer components may, in some embodiments, provide the pressure-sensitive adhesive with improved adhesive strength to an adherend and/or a higher cohesive strength. Each of the different copolymerizable monomers can be used alone or in combination with others.

Exemplary polar-group-containing monomers include carboxyl-containing monomers such as (meth)acrylic acids, itaconic acid, maleic acid, fumaric acid, crotonic acid, and isocrotonic acid, along with anhydrides of them, such as maleic anhydride; hydroxyl-containing monomers including hydroxyalkyl (meth)acrylates such as hydroxyethyl (meth) acrylates, hydroxypropyl (meth) acrylates, and hydroxybutyl (meth)acrylates; amido-containing monomers such as acrylamide, methacrylamide, N,N-dimethyl(meth)acrylamides, N-methylol (meth)acrylamides, N-methoxymethyl (meth)-acrylamides, and N-butoxymethyl(meth)acrylamides; amino-containing monomers such as aminoethyl (meth)acrylates, dimethylaminoethyl (meth)acrylates, and t-butylaminoethyl (meth) acrylates; glycidyl-containing monomers such as glycidyl (meth)acrylates and methylglycidyl (meth)acrylates; cyano-containing monomers such as acrylonitrile and methacrylonitrile; heterocycle-containing vinyl monomers such as N-vinyl-2-pyrrolidone, (meth)acryloylmorpholines, N-vinylpyridine, N-vinylpiperidone, N-vinylpyrimidine, N-vinylpiperazine, N-vinylpyrrole, N-vinylimidazole, N-vinyloxazole, and N-vinylcaprolactam; alkoxyalkyl (meth)acrylate monomers such as methoxyethyl (meth)acrylates and ethoxyethyl (meth)acrylates; sulfo-containing monomers such as sodium vinylsulfonate; phosphate-containing monomers such as 2-hydroxyethylacryloyl phosphate; imido-containing monomers such as cyclohexylmaleimide and isopropylmaleimide; and isocyanate-containing monomers such as 2-methacryloyloxyethyl isocyanate. Of these polar-group-containing monomers, acrylic acid and other carboxyl-containing monomers, and anhydrides thereof, are preferred. The amount of polar-group-containing monomers present is typically 30 percent by weight or less (e.g., from 0.1 to 30 percent by weight), and preferably from 0.1 to 15 percent by weight, based on the total amount of monomer components in the acrylic polymer. Polar-group-containing monomers, if used in an amount of more than 30 percent by weight, may cause the acrylic pressure-sensitive adhesive to have an excessively high cohesive strength and thereby show insufficient tackiness. Conversely, polar-group-containing monomers, if used in an excessively small amount (e.g., less than 1 percent by weight based on the total amount of monomer components in the acrylic polymer) may not satisfactorily provide the acrylic pressure-sensitive adhesive with a sufficient cohesive strength and/or a sufficiently high shearing force.

Examples of the multifunctional monomers include hexanediol di(meth)acrylates, butanediol di(meth)acrylates, (poly)ethylene glycol di(meth)acrylates, (poly)propylene glycol di(meth)acrylates, neopentyl glycol di(meth)acrylates, pentaerythritol di(meth)acrylates, pentaerythritol tri (meth)acrylates, dipentaerythritol hexa(meth)acrylates, trimethylolpropane tri(meth)acrylates, tetramethylolmethane tri(meth)acrylates, allyl (meth)acrylates, vinyl (meth) acrylates, divinylbenzene, epoxy acrylates, polyester acrylates, and urethane acrylates. The amount of multifunctional monomers present is typically 2 percent by weight or less (e.g., from 0.01 to 2 percent by weight) and preferably 0.02 to 1 percent by weight, based on the total amount of monomer components in the acrylic polymer. Multifunctional monomers, if used in an amount of more than 2 percent by weight of the total amount of monomer components in the acrylic polymer, may cause the acrylic pressure-sensitive adhesive to have an excessively high cohesive strength, resulting in insufficient tackiness. Multifunctional monomers, if used in an excessively small amount (e.g., less than 0.01 percent by weight of the total amount of monomer components for constituting the acrylic polymer), may not provide the acrylic pressure-sensitive adhesive with a sufficient cohesive strength.

In addition to the polar-group-containing monomers and multifunctional monomers, exemplary copolymerizable monomers usable herein further include vinyl esters such as vinyl acetate and vinyl propionate; aromatic vinyl compounds such as styrene and vinyltoluene; olefins or dienes such as ethylene, butadiene, isoprene, and isobutylene; vinyl ethers such as vinyl alkyl ethers; and vinyl chloride. Exemplary copolymerizable monomers further include (meth) acrylates each having an alicyclic hydrocarbon group, such as cyclopentyl (meth)acrylates, cyclohexyl (meth)acrylates, and isobornyl (meth)acrylates.

The pressure-sensitive adhesive layers 120, 122 may contain one or more suitable additives. Exemplary additives usable herein include silanes, tackifiers (e.g., rosin esters, terpenes, phenols, and aliphatic, aromatic, or mixtures of aliphatic and aromatic synthetic hydrocarbon resins), cross-linking agents (e.g., polyisocyanate compounds, silicone compounds, epoxy compounds, and alkyl-etherified melamine compounds), surfactants, plasticizers (other than physical blowing agents), nucleating agents (e.g., talc, silica, or $TiO_2$), fillers (e.g., glass or polymeric low-density microspheres), fibers, age inhibitors, antioxidants, ultraviolet-absorbers, antistatic agents, lubricants, pigments, dyes, reinforcing agents, hydrophobic or hydrophilic silica, calcium carbonate, toughening agents, flame retardants, finely ground polymeric particles (e.g., polyester, nylon, or polypropylene), stabilizers (e.g., UV stabilizers), colorants (e.g., dyes and pigments such as carbon black), and combinations thereof.

The inclusion of low-density microspheres effectively creates voids in the pressure-sensitive adhesive. Advantageously, this results in a foamed structure that has resulted in a double-coated tape 100 with enhanced shock/impact resistance. In an exemplary embodiment, one or both of the first and second pressure-sensitive adhesive layers 120, 122 contain low density microspheres present in an amount of at least 0.1 percent, at least 0.3 percent, at least 0.5 percent, at least 0.7 percent, or at least 1 percent by weight, relative to the overall composition of the associated pressure-sensitive adhesive layer 120, 122. In an exemplary embodiment, one or both of the first and second pressure-sensitive adhesive layers 120, 122 contain low density microspheres present in an amount of at most 5 percent, at least 4 percent, at least 3 percent, or at least 2 percent, relative to the overall composition of the associated pressure-sensitive adhesive layer 120, 122.

In a preferred embodiment, the pressure-sensitive adhesive is an acrylic pressure-sensitive adhesive containing a high glass transition temperature oligomer ("HTGO"). Advantageously, the addition of an HTGO can provide a micro-domain phase morphology that enhances adhesion to low surface energy surfaces and creep resistance at high temperatures. Further options and advantages associated with HTGOs are described, for example, in U.S. Patent Publication No. US 2015/0044457 (Chen et al.).

The pressure-sensitive adhesive optionally contains a crosslinking agent, or a combination of crosslinking agents, to increase the shear strength of the adhesive. Useful crosslinking agents include substituted triazines, such as those disclosed in U.S. Pat. No. 5,602,221 (Bennett et al.).

The composition used in the pressure-sensitive adhesive layers 120, 122 can be prepared by mixing a base polymer, any additives, and any other components based on known techniques.

Though not so limited, the pressure-sensitive adhesive layers 120, 122 may be formed, for example, by applying the pressure-sensitive adhesive composition to a suitable support (carrier) such as a release liner or base material, to form the layers. Where necessary, additional processes, such as heating and/or drying, may be conducted.

Optionally, one or both of the pressure-sensitive adhesive layers 120, 122 is comprised of two or more pressure-sensitive adhesive sublayers. The total thickness of the pressure-sensitive adhesive layers (the total thickness of the sublayers arranged on or above one or both sides of carrier film 150) can be at least 5 micrometers, at least 10 micrometers, at least 20 micrometers, or at least 25 micrometers. In some embodiments, the total thickness of the pressure-sensitive adhesive layers is at most 200 micrometers, at most 170 micrometers, at most 150 micrometers, or at most 100 micrometers.

Where one or both of the pressure-sensitive adhesive layers 120, 122 include multiple sublayers, the thickness of an individual sublayer can be at least 5 micrometers, at least 10 micrometers, at least 15 micrometers, or at least 20 micrometers. In some embodiments, the thickness of the individual layer component is at most 100 micrometers, at most 85 micrometers, at most 75 micrometers, or at most 65 micrometers.

Suitable materials for plastic skin layers 130, 132 include, for example, polyolefins such as high-density polyethylene (HDPE), low-density polyethylene (LDPE), linear low-density polyethylene (LLDPE), ultra linear low-density polyethylene U-LLDPE) and polypropylene (PP); polyvinyl polymers such as polyvinyl chloride (PVC) and polyvinyl acetate (PVA); polyolefin-based copolymers such as ethylene-methacrylic acid copolymer (EEMA) and ethylene-vinyl acetate copolymer (EVA); block copolymers such as acrylic block copolymers and styrene-isoprene-vinyl acetate copolymer; polyamide-modified polyether, and thermoplastic elastomers (TPE).

The material above may be composed of one of the aforementioned polymers or a combination of two or more thereof. For example, one or both of the plastic skin layers 130, 132 may be a composite film obtained by laminating and integrating two or more polymer films. Alternatively, one or both of the plastic skin layers 130, 132 may be a blend or copolymer of two or more of the aforementioned polymers.

Preferred materials for the first and second plastic skin layers 130, 132 are thermoplastic resins that are semi-crystalline and have a melting temperature of at least 70° C., at least 75° C., at least 80° C., or at least 85° C. Preferred semi-crystalline thermoplastic resins have a melting temperature of at most 130° C., at most 125° C., at most 120° C., or at most 112° C.

In some embodiments, one or both of the first and second plastic skin layers 130, 132 have an average thickness of at least 10 micrometers, at least 15 micrometers, or at least 20 micrometers. In some embodiments, one or both of the first and second plastic skin layers 130, 132 have an average thickness of at most 50 micrometers, at least 40 micrometers, or at least 30 micrometers.

The elastic base layer 140, centrally located in the double-coated tape 100, is preferably highly impact-resistant. Typically, the elastic base layer 140 is significantly less stiff than either of the first or second plastic skin layers 130, 132.

Suitable materials for elastic base layer 140 include, for example, natural rubbers, thermoplastic rubbers, thermoplastic polyolefins, ethylene propylene diene monomer, polyisobutylene, thermoplastic polyurethanes, and rubber-resin type blends of thermoplastic rubbers and adhesive-forming resins. In some embodiments, the rubber component is non-vulcanized and imparts rubber elasticity and cohesive strength to the film. Examples of thermoplastic rubbers include olefinic block copolymers, styrene-butadiene block copolymers and styrene-isoprene block copolymers. Examples of an adhesive-forming resins include natural and synthetic resins present as an ester or free acid, such as a rosin derivative, terpene resin, terpene-phenol resin, and synthetic petroleum resin. If desired, the resin may be hydrogenated, disproportionated, or dimerized.

In some embodiments, the elastic base layer 140 has an average thickness of at least 20 micrometers, at least 30 micrometers, at least 40 micrometers, or at least 50 micrometers. In some embodiments, the elastic base layer 140 has an average thickness of at most 130 micrometers, at least 120 micrometers, at least 110 micrometers, or at least 100 micrometers.

The relative thicknesses of the first and second plastic layers 130, 132 and the elastic base layer 140 can significantly affect the overall impact/shock resistance of the double-coated tape 100 as well as the ability to convert the same in a die-cutting operation. In preferred embodiments, each of the first and second plastic skin layers 130, 132 has an average thickness of at least 10 percent, at least 15 percent, at least 20 percent, or at least 25 percent the average thickness of the elastic base layer 140. In preferred embodiments, each of the first and second plastic skin layers 130, 132 has an average thickness of at most 50 percent, at most 45 percent, at most 40 percent, or at most 35 percent the average thickness of the elastic base layer 140.

At least some of the first or second plastic skin layer 130, 132 and elastic base layer 140 may further include one or more additives known to those of skill in the art to enhance the functional or decorative aspects of the tape 100. Such additives could include, for example, fillers, anti-oxidants, ultraviolet stabilizers, processing aids, and coloring agents.

Where the tape 100 is used in electronic display or touchscreen applications, carbon black (CB) filler can be advantageously incorporated into one or both of the first and second plastic skin layers 130, 132 to efficiently prevent light leakage through the tape 100 along peripheral edges of the display or touchscreen.

Advantageously, the tape 100 can provide high adhesive performance with a very thin and flat geometry. In exemplary embodiments, the tape 100 has an overall thickness of at least 50 micrometers, at least 75 micrometers, at least 100 micrometers, at least 125 micrometers, or at least 150 micrometers. In the same or alternative embodiments, the tape 100 has an overall thickness of at most 400 micrometers, at most 375 micrometers, at most 350 micrometers, at most 325 micrometers, or at most 300 micrometers.

The shock/impact performance of the tape 100 can be characterized using the Tensile Drop Test, whose details are described in the Examples section (below), using the test configurations shown in FIGS. 6 and 7. In preferred embodiments, the double-coated tape 100 withstands at least 15 drops, at least 18 drops, or at least 20 drops according to the 40 centimeter Tensile Drop Test.

The adhesive strength of the tape 100 can be characterized by the Push-out Test, also described in detail in the Examples section. Preferred embodiments of the double-coated tape 200 yield a push-out force of at least 80 newtons, at least 85 newtons, or at least 90 newtons, according to the Push-out Test.

In preferred embodiments, the double-coated tape 100 is reworkable, meaning that the tape 100 can be cleanly removed from the lens or substrate even after bonding. Advantageously, the inclusion of the elastic base layer 140 into the carrier film 150 allows the tape 100 to be cleanly detached from a surface to which it is bonded under certain circumstances. For example, this could be accomplished by applying gentle heat to the bonded surfaces and stretching the tape 100 in a lateral direction (parallel to the surface) to de-laminate the adhesive.

The adhesive performance of the tape 100 can be limited by the quality of adhesion between its constituent layers. Interlayer adhesion can be improved by chemically modifying one or more interfacial surfaces of the tape 100. For example, the outward-facing surfaces of the carrier film 250 may be surface functionalized to promote adhesion to the pressure sensitive adhesive layers 220, 222. Optionally, surface functionalization can be achieved using plasma treatment, air corona treatment, nitrogen corona treatment, plasma treatment, electron beam irradiation, or ultraviolet radiation.

Figure 3:
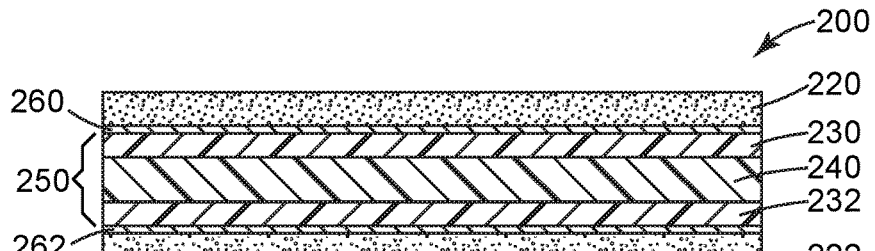
FIG. 3 is a schematic cross-sectional view of a double-coated tape according to another exemplary embodiment.

An alternative to chemical modification is shown in a modified double-coated tape 200 shown in FIG. 3. Like the double-coated tape 100, the tape 200 has a multilayered structure that includes a carrier film 250 disposed between a pair of pressure-sensitive adhesive layers 220, 222, where the carrier film 250 includes an elastic base layer 240 and a pair of plastic skin layers 230, 232 disposed on opposing major surfaces of the elastic base layer 240. Unlike the tape 100, the tape 200 includes first and second primer coatings 260, 262 disposed at the interface between the carrier film 250 and respective first and second pressure-sensitive adhesive layers 220, 222.

The primer coatings 260, 262, enhance interlayer adhesion by having a composition chemically compatible with both the plastic skin layers 230, 232 and the pressure sensitive adhesive layers 220, 222. Such compatibility can be manifested by, for example, the presence of polymeric interpenetration and chain entanglements between layers at the interface. Alternatively, the primer coatings 260, 262 could include chemical moieties capable of covalently bonding with chemical moieties on the plastic skin layers 230, 232 and/or the pressure sensitive adhesive layers 220, 222 to promote interlayer adhesion.

As a further option, suitable primer compositions could derive from a continuous gelled network of inorganic oxide particles used in combination with an effective amount of an ambifunctional silane located in or on the gelled network, as described in Canadian Patent No. 2,002,449 (Strobel et al.).

Figure 4:
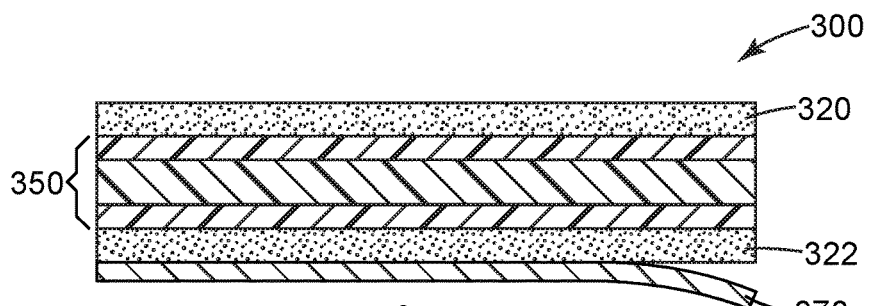
FIG. 4 is a schematic cross-sectional view of a double-coated tape according to still another exemplary embodiment.

FIG. 4 shows another embodiment of a double-coated tape 300. The tape 300 has a layered construction with a carrier layer 350 and pressure-sensitive adhesive layers 320, 322 essentially identical to that of the tape 100, except the tape 300 further includes a release liner 370 releasably adhered to the exposed major surface of the second pressure-sensitive adhesive layer 322 to facilitate handling and storage prior to use. Optionally, a second release liner can be disposed on the first pressure-sensitive adhesive layer 320. As a further option, if the tape 300 is manufactured in a continuous process and wound into a roll, the release liner 370 can advantageously protect both the first and second pressure-sensitive adhesive layers 320, 322.

Figure 5:
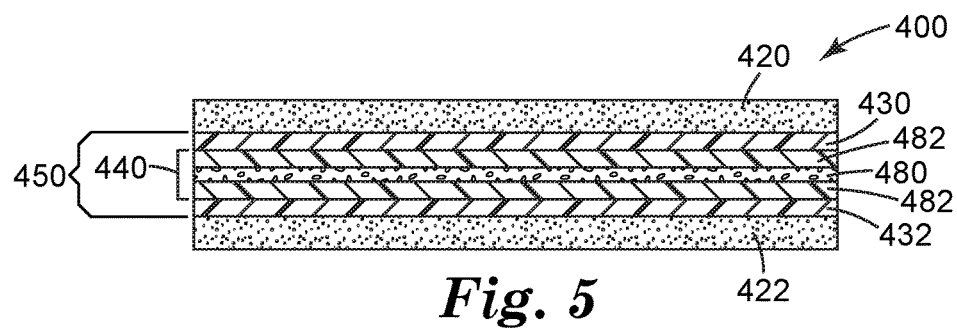
FIG. 5 is a schematic cross-sectional view of a double-coated tape according to yet another exemplary embodiment.

FIG. 5 shows yet another embodiment of a double-coated tape 400 including, like prior embodiments, a pair of pressure-sensitive adhesive layers 320, 322 symmetrically disposed on opposing sides of a carrier film 450. The carrier film 450 includes a pair of plastic skin layers 430, 432 symmetrically disposed on opposing sides of an elastic base layer 440, but the elastic base layer 440 has a differentiated layered construction as described below.

Referring again to FIG. 5, the elastic base layer 440 includes a foam core 480 embedded in first and second elastic films 482, 482 that are not foamed. Here, the first and second elastic films 482, 482 contain the same elastomer, but the films may alternatively contain different elastomers. Optionally, the elastic films 482 have essentially the same elastomeric resin components as that of the foam core 480, with the only difference being the presence of a foaming agent (such as a blowing agent or quantity of expandable microspheres) in the foam core 480. In an exemplary embodiment, the foam core 480 is a closed-cell foam obtained by blending expandable microspheres into an elastomer resin.

In some embodiments, the foaming agent is present in an amount of at least 0.2 percent by weight relative to the overall weight of the foam core 480. In some embodiments, the foaming agent is present in an amount of at most 5 percent relative to the overall weight of the foam core 480.

Advantageously, the presence of the foam core 480 can enhance the overall shock or impact resistance of the double-coated tape 400. Preferably, the foam core 480 accounts for at least 1 percent, at least 5 percent, at least 10 percent, or at least 20 percent of the average thickness of the elastic base layer 440. Preferably, the foam core 480 accounts for at most 100 percent, at most 75 percent, at most 50 percent, at most 30 percent, or at most 20 percent of the average thickness of the elastic base layer 440.

Further aspects of the double-coated tapes 200, 300, 400 are essentially analogous to those already described with respect to the double-coated tape 100 and shall not be repeated.

The double-coated pressure-sensitive adhesive tapes disclosed herein can be made using various manufacturing methods known to those of skill in the art. With respect to the tape 100, for example, each of its constituent layers may be formed through a continuous extrusion process and laminated together. Depending on the nature of the plastic skin and elastic base components, two or more layers may be coextruded through the same die. Where the carrier film of the double-coated tape has a symmetric layer configuration, as described herein, its manufacturing can be facilitated using a blown film extrusion process, which can afford greater control over layer width and thickness.

In an exemplary blown film process, the plastic skin polymer and elastic base polymer are simultaneously extruded through concentric annular orifices disposed in a blown film die. The extruded polymeric tubes are inflated by pressurized air as rollers draw the tube upwards, thus causing lateral and vertical stretching of the film. The extruded multilayered tube is then continuously slit, spread open to form a flat sheet, and guided through nip rolls to produce a carrier film comprising the first plastic skin layer, elastic base layer, and second plastic film layer. The first and second pressure-sensitive adhesive layers, which may be separately extruded, can then be laminated to opposing major surfaces of the carrier film to provide the double-coated pressure-sensitive adhesive tape.

Advantageously, the quality of adhesion between the pressure-sensitive adhesives and adjacent plastic skin layers can be substantially enhanced through surface functionalization of at least one adherent layer prior to laminating the layers to each other. As mentioned previously, such surface modification could be achieved by corona discharge treatment, plasma discharge treatment, flame treatment, electron beam irradiation, ultraviolet irradiation and coating with a suitable primer.

In one advantageous surface treatment, described in U.S. Pat. No. 5,888,594 (David et al.), one or both of the first and second plastic skin layers are etched by combining hexamethyldisiloxane vapor and oxygen gas in a single pass process.

While not intended to be limiting, particular embodiments of the double-coated tape and combinations thereof are enumerated as follows:

1. A double-coated tape comprising, in the following order: a first pressure-sensitive adhesive layer; a first plastic skin layer; an elastic base layer; a second plastic skin layer; and a second pressure-sensitive adhesive layer, wherein the first pressure-sensitive adhesive layer and the second pressure-sensitive adhesive layer are outermost layers on either side of the double-coated tape.
2. The double-coated tape of embodiment 1, wherein the elastic base layer comprises an elastomer selected from: styrenic block copolymers, olefinic block copolymers, thermoplastic polyolefins, natural rubber, styrene butadiene rubber, ethylene propylene diene monomer, polyisobutylene, thermoplastic polyurethanes, and blends and copolymers thereof.
3. The double-coated tape of embodiment 1 or 2, wherein the elastic base layer comprises a foam.
4. The double-coated tape of embodiment 3, wherein the elastic base layer comprises, in the following order: a first elastic film; a foam core; and a second elastic film.
5. The double-coated tape of embodiment 4, wherein the foam core comprises an elastomer and a foaming agent dispersed in the elastomer.
6. The double-coated tape of embodiment 5, wherein the foaming agent is present in an amount ranging from 0.2 percent to 5 percent by weight relative to the overall weight of the foam core.
7. The double-coated tape of any one of embodiments 4-6, wherein both the first and second elastic films comprise the elastomer.
8. The double-coated tape of any one of embodiments 4-7, wherein the foam core accounts for 1 percent to 99 percent of the average thickness of the elastic base layer.
9. The double-coated tape of embodiment 8, wherein the foam core accounts for 1 percent to 50 percent of the average thickness of the elastic base layer.
10. The double-coated tape of embodiment 9, wherein the foam core accounts for 1 percent to 20 percent of the average thickness of the elastic base layer.
11. The double-coated tape of any one of embodiments 1-10, wherein the elastic base layer has an average thickness ranging from 20 micrometers to 130 micrometers.
12. The double-coated tape of embodiment 11, wherein the elastic base layer has an average thickness ranging from 30 micrometers to 120 micrometers.
13. The double-coated tape of embodiment 12, wherein the elastic base layer has an average thickness ranging from 50 micrometers to 100 micrometers.
14. The double-coated tape of any one of embodiments 1-13, wherein each of the first and second plastic skin layers comprises a semicrystalline thermoplastic resin having a melting temperature ranging from 70° C. to 130° C.
15. The double-coated tape of embodiment 14, wherein each of the first and second plastic skin layers comprises a thermoplastic resin having a melting temperature ranging from 80° C. to 120° C.
16. The double-coated tape of embodiment 15, wherein each of the first and second plastic skin layers comprises a thermoplastic resin having a melting temperature ranging from 85° C. to 112° C.
17. The double-coated tape of any one of embodiments 1-16, wherein each of the first and second plastic skin layers comprises a polymer selected from: high density polyethylene, low density polyethylene, ethylene vinyl acetate, polyurethane, styrenic block copolymers, polyamide-modified polyether, and blends and copolymers thereof.
18. The double-coated tape of any one of embodiments 1-17, wherein each of the first and second plastic skin layers has an average thickness ranging from 10 micrometers to 50 micrometers.
19. The double-coated tape of embodiment 18, wherein each of the first and second plastic skin layers has an average thickness ranging from 15 micrometers to 40 micrometers.

20. The double-coated tape of embodiment 19, wherein each of the first and second plastic skin layers has an average thickness ranging from 20 micrometers to 30 micrometers.
21. The double-coated tape of any one of embodiments 1-20, wherein each of the first and second plastic skin layers has an average thickness ranging from 10 percent to 50 percent of the average thickness of the elastic base layer.
22. The double-coated tape of embodiment 21, wherein each of the first and second plastic skin layers has an average thickness ranging from 20 percent to 40 percent the average thickness of the elastic base layer.
23. The double-coated tape of embodiment 22, wherein each of the first and second plastic skin layers has an average thickness ranging from 25 percent to 35 percent the average thickness of the elastic base layer.
24. The double-coated tape of any one of embodiments 1-23, wherein each of the first and second pressure-sensitive adhesive layers comprises an acrylic pressure-sensitive adhesive.
25. The double-coated tape of any one of embodiments 1-24, wherein each acrylic pressure-sensitive adhesive comprises a high glass transition temperature oligomer.
26. The double-coated tape of embodiment 25, wherein each acrylic pressure-sensitive adhesive has a microdomain phase morphology.
27. The double-coated tape of any one of embodiments 1-26, wherein one or both of the first and second pressure-sensitive adhesive layers comprise low density microspheres.
28. The double-coated tape of embodiment 27, wherein the low density microspheres are present in an amount ranging from 0.1 percent to 5 percent by weight, relative to the overall composition of the pressure-sensitive adhesive layer.
29. The double-coated tape of embodiment 28, wherein the low density microspheres are present in an amount ranging from 0.5 percent to 3 percent by weight, relative to the overall composition of the pressure-sensitive adhesive layer.
30. The double-coated tape of embodiment 29, wherein the low density microspheres are present in an amount ranging from 1 percent to 2 percent by weight, relative to the overall composition of the pressure-sensitive adhesive layer.
31. The double-coated tape of any one of embodiments 1-30, further comprising a release liner adhered to at least one of the first and second pressure-sensitive adhesive layers.
32. The double-coated tape of any one of embodiments 1-31, further comprising a first primer situated between the first pressure-sensitive adhesive layer and the first plastic skin layer.
33. The double-coated tape of embodiment 32, further comprising a second primer coating situated between the second pressure-sensitive adhesive layer and the second plastic skin layer.
34. The double-coated tape of any one of embodiments 1-31, wherein each of the first and second plastic skin layers is surface functionalized by plasma treatment and directly contacts a respective pressure-sensitive adhesive layer.
35. The double-coated tape of any one of embodiments 1-31, wherein each of the first and second plastic skin layers is surface functionalized by corona treatment and directly contacts a respective pressure-sensitive adhesive layer.
36. The double-coated tape of any one of embodiments 1-35, wherein the one or more of the first and second plastic skin layer and elastic base layer comprises an additive selected from: fillers, anti-oxidants, ultraviolet stabilizers, processing aids, and coloring agents.
37. The double-coated tape of embodiment 36, wherein the additive comprises carbon black filler.
38. The double-coated tape of any one of embodiments 1-37, wherein the double-coated tape has an overall thickness ranging from 50 micrometers to 400 micrometers.
39. The double-coated tape of embodiment 38, wherein the double-coated tape has an overall thickness ranging from 100 micrometers to 350 micrometers.
40. The double-coated tape of embodiment 39, wherein the double-coated tape has an overall thickness ranging from 150 micrometers to 300 micrometers.
41. The double-coated tape of any one of embodiments 1-40, wherein the double-coated tape withstands at least 15 drops according to the 40 centimeter Tensile Drop Test.
42. The double-coated tape of embodiment 41, wherein the double-coated tape withstands at least 18 drops according to the 40 centimeter Tensile Drop Test.
43. The double-coated tape of embodiment 42, wherein the double-coated tape withstands at least 20 drops according to the 40 centimeter Tensile Drop Test.
44. The double-coated tape of any one of embodiments 1-43, wherein the double-coated tape yields a push-out force of at least 80 newtons according to the Push-out Test.
45. The double-coated tape of embodiment 44, wherein the double-coated tape yields a push-out force of at least 85 newtons according to the Push-out Test.
46. The double-coated tape of embodiment 45, wherein the double-coated tape yields a push-out force of at least 90 newtons according to the Push-out Test.\
47. A device assembly using the double-coated tape of any one of embodiments 1-46, comprising: a transparent lens; and the double-coated tape adhesively coupled to the transparent lens.
48. The device assembly of embodiment 47, further comprising a substrate, wherein the double-coated tape adhesively couples the transparent lens and the substrate to each other.
49. A method of making the double-coated tape of any one of embodiments 1-46, comprising: simultaneously extruding first and second plastic skin resins and an elastic base resin through a blown film die to form an extruded tube; slitting the extruded tube to provide a carrier film comprising the first plastic skin layer, elastic base layer, and second plastic film layer; and laminating the first and second pressure-sensitive adhesive layers to opposing major surfaces of the carrier film to provide the double-coated tape.
50. A method of making the double-coated tape of any one of embodiments 1-46, comprising: coextruding first and second plastic skin resins and an elastic base resin through a die to form a carrier film comprising the first plastic skin layer, the elastic base layer, and the second plastic skin layer; and laminating the first and second pressure-sensitive adhesive layers to opposing major surfaces of the carrier film to provide the double-coated tape.

51. The method of embodiment 49 or 50, further comprising surface functionalizing one or both opposing major surfaces of the carrier film by corona treatment prior to laminating the first and second pressure-sensitive adhesive layers.

52. The method of embodiment 49 or 50, further comprising surface functionalizing one or both opposing major surfaces of the carrier film by plasma treatment prior to laminating the first and second pressure-sensitive adhesive layers.

53. The method of embodiment 52, wherein the plasma treatment comprises etching one or both of the first and second plastic skin layers by mixing hexamethyldisiloxane vapor and oxygen gas in a single pass process.

54. The method of claim 49 or 50, further comprising surface functionalizing one or both opposing major surfaces of the carrier film by a primer coating process prior to laminating the first and second pressure-sensitive adhesive layers.

Examples

The following examples are intended to illustrate exemplary embodiments within the scope of this disclosure. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Tensile Drop Test—Room Temperature Conditioning

Figure 6:
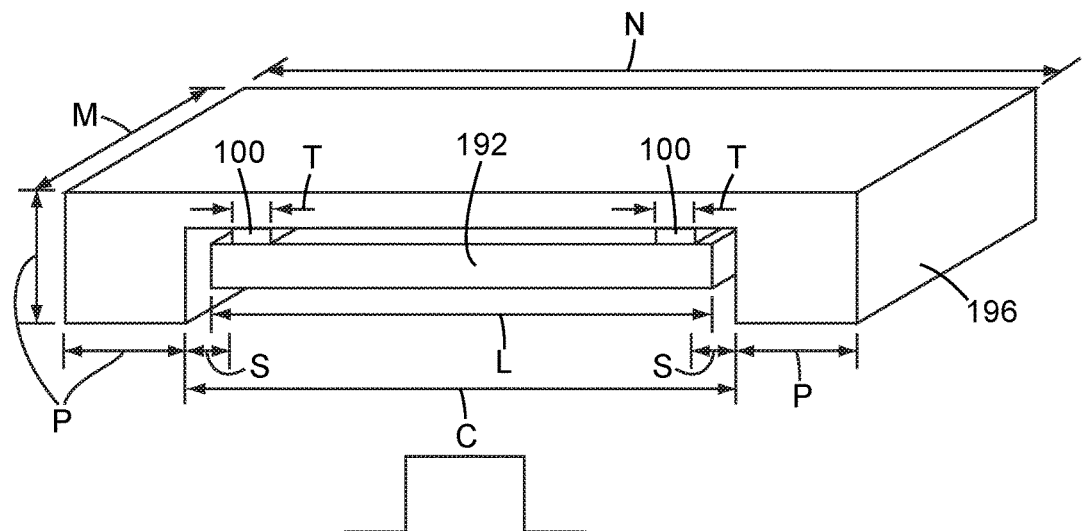
FIG. 6 shows a test configuration for evaluating impact performance of double-coated tapes.

Referring to FIG. 6, a poly(methyl methacrylate ("PMMA") panel 192 (available from Aeromat Plastics, Burnsville, MN, under the trade designation "TEST PANEL-CLEAR ACRYLITE ARII") having dimensions "M"=2 inches (5.1 cm) by "L"=4 inches (10.2 cm) by 0.236 inches (0.60 cm) was washed three times with 2-propanol. The surface energy of the washed surface was measured using a portable goniometer (available from FIBRO System AB, Sweden, under the trade designation "POCKET GONIOMETER PG-X"), and was found to be approximately 39-40 dyne/cm.

Two strips of double-sided pressure-sensitive adhesive tape 100 (or a comparative example tape material) having a width of "T"=2 mm and a length of 2 inches (5.1 cm) were applied lengthwise across the width of the underside cavity of a custom made aluminum test fixture 196, such that the strips of tape were "S"=0.5 inch (~1.3 cm) from the end walls of the cavity, as shown in FIG. 6. Test fixture 196 had a width "M"=2 inches (5.1 cm) by length "N"=4.5 inches (13.97 cm by height "P"=0.5 inch (~1.3 cm), and had a mass of 143 grams.

PMMA panel 192 was centered within the cavity of test fixture 196 and in contact with the each of the tape strips 100 to provide a bonded article. The bonded article was then positioned with the cavity facing upward and a 4 kg (8.8 lb.) weight was placed on the exposed surface of the PMMA panel for 15 seconds, after which time the weight was removed and the bonded article was allowed to dwell for 24 hours at 23° C. and 50% RH.

The bonded article was then evaluated for drop resistance in a tensile mode using a drop tester (available from Shinyei Corporation of America, New York, NY, under the trade designation "DT-202") and a horizontal orientation of the bonded article with the PMMA substrate facing downward, as in FIG. 6 (i.e., with the large arrow indicating downward direction). The bonded article was dropped from a height of either 40 cm or 70 cm onto a 1.2 cm thick steel plate. Two samples were tested for each height, the number of drops to failure recorded for each sample. In addition, the failure mode was recorded: "PO" for pop-off (i.e., the double-sided pressure-sensitive adhesive tape de-bonded from the PMMA panel), cohesive, core split, or "2B" for 2-bond failure. Combinations of failure modes were noted where observed.

Push-Out Test

Major surfaces of a poly(methyl methacrylate ("PMMA") panel (available from Aeromat Plastics, Burnsville, MN, under the trade designation "TEST PANEL-CLEAR ACRYLITE ARII") having dimensions of 2 inches (5.1 cm) by 4 inches (10.2 cm) by 0.236 inches (0.60 cm), and a pre-drilled PMMA panel having dimension of 2 inch (5.1 cm) by 5 inch (12.7 cm) and a 15 mm hole in the center of the panel were washed three times with 2-propanol. Two strips of double-sided pressure-sensitive adhesive tape 100 (or a comparative example tape material) having a width of 2 mm and a length of 2 inches (5.1 cm) were applied across the width of the pre-drilled PMMA panel, 2 inches (5.1 cm) from ends of the panel. The TEST PANEL-CLEAR ACRYLITE ARII centered and pressed onto the adhesive tape strips using a 4 kg weight for 30 seconds. The samples were allowed to dwell for 72 hours at room temperature prior to testing. An Instron device having a 12 mm probe attachment and pushing rate of 2 inches (5.1 cm) per minute was used for pushing the panels apart, measuring the pushing force during the pushing process. The test was terminated when the panels separated, and the peak load in Newtons ("N") was recorded. In addition, the failure mode was recorded: "PO" for pop-off (i.e., the double-sided pressure-sensitive adhesive tape de-bonded from the PMMA panel), core split, or "2B" for 2-bond failure. Combinations of failure modes were noted where observed.

Anti-Repulsion Test

An anodized aluminum strip (180 mm×20 mm×0.5 mm) was cut from sheet stock (available from Lawrence & Fredrick, Stremwood, IL under the trade designation "5005 ALLOY H34 TEMPER MILL FINISH UND/UNSEALED ANODIZED ALUMINUM"). A polycarbonate substrate having a length of 7.9 inches (200 mm), width of 1.19 inch (30 mm), and a thickness of 0093 inch (~2 mm) was obtained from Bayer MaterialScience AG, Germany, under the trade designation "MAKROLON 2405".

A double coated tape sample (>30 mm width and 200 mm length, and protected on one side by release liner) was laminated onto the anodized aluminum strip using a rubber roller. Excess tape around all four edges of aluminum strip were carefully trimmed away. The release liner was removed, and then using light finger pressure, the adhesive side of the specimen was pressed onto the substrate, aligning one end of the specimen edge flush with end of substrate and down the center. The laminated specimen with aluminum strip side up was placed on a rolling machine, and was rolled once in each direction at 12 inches (~30 cm) per minute with 15 pound (~6.8 kg) weight. The specimen was stored in a constant temperature and humidity room (23+/−2 C and 50+/−1% relative humidity) for 24+/−2 hours.

Ends of the laminated specimen were bent slightly downward (with substrate side down), and the laminated specimen was placed in a bending jig having a length of 190 mm. The bending jig with test sample was placed into a 70° C. oven for 24+/−1 hour. The bending jig with sample was then removed from the oven and allowed to cool for 30 minutes. A steel ruler was then used to measure "lifting" of the specimen from substrate at very end of tape sample. Distance was measured from top surface of substrate to bottom face of adhesive surface, and the value was recorded to the nearest 1 mm.

TABLE 1

Materials Used in Multilayer Carrier Film

| Designation | Description | Source |
|---|---|---|
| G1657 | A hydrogenated SEBS rubber, available from Kraton Polymer under the trade designation "G1657" | Kraton Polymer, Houston, TX |
| EVA | A poly(ethylene vinyl acetate), available from Westlake under the trade designation "EF446AA" | Westlake, Houston, TX |
| AFFINITY 1880 | An ethylene octene copolymer, available from Dow Chemical under the trade designation "AFFINITY 1880" | Dow Chemical, Houston, TX |
| BYNEL 3101 | An acid/acrylate-modified ethylene vinyl acetate polymer, available from DuPont Corp. under the trade designation "BYNEL 3101" | DuPont Corp., Wilmington, DE |
| LLDPE | A low density polyethylene, available from Dow Chemical under the trade designation "DOWLEX 2045" | Dow Chemical, Houston, TX |
| CB | A carbon black, available from PolyOne Corp. under the trade designation "CARBON BLACK 4105 VAC BLACK" | PolyOne Corporation, Eagan, MN |
| D1161 PT | A SIS rubber, available from Kraton Polymer under the trade designation "D1161 PT" | Kraton Polymer, Houston, TX |
| D1161 blend | A blend of "D1161 PT" and "G1657" materials (each described in this table), blended in a weight ratio of 50:50. | Kraton Polymer, Houston, TX |
| Flashing std | A blend of BYNEL 3101 and AFFINITY 1880 (each described in this table), in a weight ratio of 20:80 | 3M Co., St. Paul, MN |
| INFUSE 9507 | An olefin block copolymer, available from Dow Chemical under the trade designation "INFUSE 9507" | Dow Chemical, Houston, TX |
| mal-LDPE | A maleated low-density polyethylene, available from Dow Chemical under the trade designation "AMPLIFY GR209" | Dow Chemical, Houston, TX |
| PX4533 | A thermoplastic elastomer made of flexible polyether and rigid polyamide, available from Arkema Specialty Polyamides under the trade designation "PEBAX 4533 SP 01" | Arkema Specialty Polyamides, France |
| 10600 ANTIBLOCK PE MB | An anti-block agent, available from Ampacet under the trade designation "10600 ANTIBLOCK PE MB" | Ampacet, Tarrytown, NY |

Preparation of Multilayer Carrier Films

Multilayer carrier films were produced on a three-layer spiral mandrel (2 inch (~5.0 cm) mandrel) blown film die. Airflow to the die was manually controlled to achieve a blow up ratio of approximately 3.5:1. The resulting bubble was subsequently collapsed approximately four feet (~1.2 m) above die and rolled up. Feed materials were supplied by two ¾ inch (~1.9 cm) BRABENDER SINGLE SCREW extruders (available from C. W. Brabender Intruments, South Hackensack, NJ) on the plastic skin layers and one ¾ inch (~1.9 cm) KILLION SINGLE SCREW extruder (available from Davis-Standard, Pawcatuck, CT) on the core.

Process Temperatures were as Follows:

Extruder temperatures for outside and inside skin layers:
Zone 1, 330° F. (166° C.); Zone 2, 360° F. (182° C.); Zone 3, 360° F. (182° C.).

Extruder temperatures for core layer:
Zone 1, 350° F. (177° C.); Zone 2, 375° F. (191° C.); Zone 3, 390° F. (199° C.).

Adaptor temperature: 390° F. (199° C.).
Die temperature: 380° F. (193° C.).

Compositions of the resulting extruded multilayer carrier films were as summarized in Table 2.

TABLE 2

Carrier Films

| Carrier Film Sample | Core layer material | Core layer thickness, mil (micrometers) | Skin layer material | Skin layer thickness (per side), mil (micrometers) | Overall carrier film (skin/core/skin) thickness, mil (micrometers) |
|---|---|---|---|---|---|
| CF-1 | G1657 | 2 (51) | HDPE:PX4533 in a weight ratio of | 1 (25) | 4 (102) |
| CF-2 | G1657 | 4 (102) | HDPE:PX4533 in a weight ratio of 1:1 | 1 (25) | 6 (152) |

TABLE 2-continued

Carrier Films

| Carrier Film Sample | Core layer material | Core layer thickness, mil (micrometers) | Skin layer material | Skin layer thickness (per side), mil (micrometers) | Overall carrier film (skin/core/skin) thickness, mil (micrometers) |
|---|---|---|---|---|---|
| CF-3 | G1657 | 4 (102) | EVA | 1 (25) | 6 (152) |
| CF-4 | INFUSE 9507 | 4 (102) | BYNEL 3101:AFFINITY 1880:AMPLIFY GR209 in weight ratio of 10:40:50 | 1 (25) | 6 (152) |
| CF-5 | G1657 | 4 (102) | BYNEL 3101:AFFINITY 1880:AMPLIFY GR209 in weight ratio of 10:40:50 | 1 (25) | 6 (152) |
| CF-6 | G1657 | 4 (102) | Flashing std | 1 (25) | 6 (152) |
| CF-7 | D1161 PT | 4 (102) | Flashing std | 1 (25) | 6 (152) |
| CF-8 | D1161 blend | 4 (102) | Flashing std | 1 (25) | 6 (152) |
| CF-9 | G1657 | 2 (51) | Flashing std | 1.5 (38) | 5 (127) |
| CF-10 | G1657/CB (98/2, w/w) | 3 (76) | LLDPE:PX4533:CB in a weight ratio of 49:49:2 | 1 (25) | 5 (127) |
| CF-11 | G1657/CB (98/2, w/w) | 3 (76) | EVA/CB in a weight ratio of 98:2 | 1 (25) | 5 (127) |

The multilayer carrier films were optionally surface-treated with a plasma etching or air corona treatment prior to treatment with a PSA material. Plasma etching treatment ("Plasma etch") was carried out using the plasma treatment apparatus described in pending patent application WO 2015/013387 (published Jan. 29, 2015) and issued U.S. Pat. No. 5,888,594 (David, et al.), except that the electrode width was increased to 42.5 inches (108 cm) and all of the pumping was carried out through a combination of two turbomolecular pumps (Leybold Model MAGW-2200 and Shimadzu Model 3203-LMC).

Alternatively, the multilayer carrier films were surface-treated with air corona treatment prior to treatment with a PSA material, at a level of 0.5 J/cm$^2$.

Acrylic PSA Preparation

TABLE 3

Materials Used in Acrylic PSA

| Designation | Description | Source |
|---|---|---|
| AA | Acrylic acid | Alfa Aesar, Ward Hill, MA |
| 2-EHA | 2-Ethylhexyl acrylate | Aldrich, St. Louis, MO |
| HDDA | 1,6-Hexanediol diacrylate | Sartomer Company, Beaumont, TX |
| HTGO | IBOA oligomer | 3M Company, St. Paul, MN |
| IBOA | Isobornyl acrylate | San Esters, New York, NY |
| IOA | Isooctyl acrylate | 3M Company, St. Paul, MN |
| IRG651 | IRGACURE 651 | Ciba (BASF), Basel, Switzerland |
| NVC | N-Vinylcaprolactam | BASF, Florham Park, NJ |
| P125 | ARKON P125 RESIN | Arakawa, Osaka, Japan |
| P140 | ARKON P140 RESIN | Arakawa, Osaka, Japan |
| R1162 | REGALREZ 1126 HYDROCARBON RESIN | Eastman, Kingsport, TN |
| XL-330 | (2,4-bis(trichloromethyl)-6-(4-methoxyphenyl)-1,3,5-triazine (see U.S. Pat. No. 4,330,590 (Vesley)) | 3M Company, St. Paul, MN |
| XL-353 | (2,4-bis(trichloromethyl)-6-(3,4-dimethoxyphenyl)-1,3,5-triazine (see U.S. Pat. No. 4,330,590 (Vesley)) | 3M Company, St. Paul, MN |
| YS Polyester TH150 | Terpene phenolic resin | Yashuhara Chemical, Hiroshima, Japan |

Acrylic PSA Group A

Acrylic PSA-Group A included 2EHA, AA, IBOA, NVC monomers and HTGO oligomers in the relative amounts summarized in Table 4 ("wt. %" referred to the weight percent of acrylate component relative to 100 weight percent of acrylate components; "php" referred to parts per hundred by weight relative to the 100 weight percent of acrylate components). The components were copolymerized in a random fashion in a two-step process: monomers (and HTGO) and a part of the initiators were pre-added ("pre-add") and mixed using a magnetic stir bar in a clear glass vial. The glass vial was then purged with nitrogen for 5 minutes to remove dissolved oxygen and then placed in front of a UV light (365 nm, ~5 mW/cm$^2$) until a coatable viscosity was achieved (i.e., partially polymerized syrup). A typical target for this step was an approximate viscosity of 3000 cP at room temperature. Tackifiers, additional initiators, and crosslinkers were then added ("post-add") to the "thickened" sample, in the relative amounts summarized in Table 4. The vial was then rotated in the dark until the solid ingredients were completely dissolved. The adhesive formulation was coated onto a releasing liner or a 2 mil (51 micrometers) primed PET film, and then further cured using 700 milliJoules per square centimeter (mJ/cm$^2$) of UV irradiation at an intensity of 1.5 milliwatts per square centimeter (mW/cm$^2$).

Acrylic PSA Group B

Acrylic PSA-Group B adhesives included IOA and AA monomers. The method for making the Group B PSAs was according to that described for the Group A PSAs. The compositions of the Group B adhesives were as summarized in Table 5.

Double Coated Tapes

Examples EX-1 through EX-23 were made by laminating both sides of a multilayer carrier film with PSA, either by hand or through a laminator, according to the combinations summarized in Table 6. The laminated sheets were left at room temperature overnight before sample preparation for testing.

TABLE 4

Acrylate Pressure Sensitive Adhesives, Group A

| | Pre-add | | | | | Post-add | | | | | |
|---|---|---|---|---|---|---|---|---|---|---|---|
| PSA Sample | 2EHA, wt. % | AA, wt. % | NVC, wt. % | IRG651, php | IBOA, wt. % | HTGO, wt. % | Total acrylate, wt. % | IRG651, php | XL330, php | Tackifier, php | Tackifier Type | E135-040D, php |
| PSA-1 | 78 | 2 | 5 | 0.04 | 5 | 10 | 100 | 0.2 | 0.12 | 7.5 | P-125 | 0 |
| PSA-2 | 78 | 2 | 5 | 0.04 | 5 | 10 | 100 | 0.2 | 0.12 | 7.5 | P-125 | 0 |
| PSA-3 | 78 | 2 | 5 | 0.04 | 5 | 10 | 100 | 0.2 | 0.12 | 7.5 | P-140 | 1.0 |
| PSA-4 | 77 | 3 | 0 | 0.04 | 10 | 10 | 100 | 0.2 | 0.12 | 7.5 | P-125 | 0 |

TABLE 5

Acrylate Pressure Sensitive Adhesives, Group B

| | Pre-add | | | | Post-add | | | | |
|---|---|---|---|---|---|---|---|---|---|
| PSA Sample | IOA, wt. % | AA, wt. % | Total acrylate, wt. % | IRG651, php | IRG651, php | XL335, php | HDDA, php | BXA, php | TH-150, php |
| PSA-5 | 97 | 3 | 100 | 0.04 | 0.2 | 0.2 | 0.04 | 0 | 30 |
| PSA-6 | 97 | 3 | 100 | 0.04 | 0.2 | 0.2 | 0.04 | 5 | 30 |
| PSA-7 | 97 | 3 | 100 | 0.04 | 0.2 | 0.2 | 0.04 | 10 | 30 |
| PSA-8 | 97 | 3 | 100 | 0.04 | 0.2 | 0.2 | 0.04 | 15 | 30 |
| PSA-9 | 95 | 5 | 100 | 0.04 | 0.2 | 0.2 | 0 | 0 | 30 |
| PSA-10 | 95 | 5 | 100 | 0.04 | 0.2 | 0.2 | 0 | 5 | 30 |
| PSA-11 | 95 | 5 | 100 | 0.04 | 0.2 | 0.2 | 0 | 10 | 30 |
| PSA-12 | 95 | 5 | 100 | 0.04 | 0.2 | 0.2 | 0 | 15 | 30 |

TABLE 6

Double Coated Tapes

| Example | Carrier film type | Carrier film thickness | Carrier Film Treatment | PSA Type | PSA layer thickness (per side), mil (micrometers) | Total thickness (PSA/Carrier Film/PSA), mil (micrometers) |
|---|---|---|---|---|---|---|
| EX-1 | CF-1 | 4 (102) | Plasma etch | PSA-1 | 4.7 (~120) | 12.4 mil (~315) |
| EX-2 | CF-2 | 6 (152) | Plasma etch | PSA-1 | 2.0 (51) | 10 (~254) |
| EX-3 | CF-3 | 6 (152) | Plasma etch | PSA-1 | 2.0 (51) | 10 (~254) |
| EX-4 | CF-4 | 6 (152) | Plasma etch | PSA-1 | 2.0 (51) | 10 (~254) |
| EX-5 | CF-5 | 6 (152) | Plasma etch | PSA-1 | 2.0 (51) | 10 (~254) |
| EX-6 | CF-6 | 6 (152) | Plasma etch | PSA-1 | 2.0 (51) | 10 (~254) |
| EX-7 | CF-7 | 6 (152) | Plasma etch | PSA-1 | 2.0 (51) | 10 (~254) |
| EX-8 | CF-8 | 6 (152) | Plasma etch | PSA-1 | 2.0 (51) | 10 (~254) |
| EX-9 | CF-9 | 5 (127) | Plasma etch | PSA-1 | 2.0 (51) | 9 (~229) |
| EX-10 | CF-9 | 5 (127) | Plasma etch | PSA-2 | 2.0 (51) | 9 (~229) |
| EX-11 | CF-9 | 5 (127) | Plasma etch | PSA-3 | 2.0 (51) | 9 (~229) |
| EX-12 | CF-9 | 5 (127) | Plasma etch | PSA-4 | 2.5 (64) | 10 (~254) |
| EX-13 | CF-9 | 5 (127) | Plasma etch | PSA-1 | 2.0 (51) | 9.8 (~249) |
| EX-14 | CF-10 | 5 (127) | Air Corona | PSA-2 | 2.0 (51) | 9 (~229) |
| EX-15 | CF-11 | 5 (127) | Air Corona | PSA-2 | 2.0 (51) | 9 (~229) |
| EX-16 | CF-9 | 5 (127) | Plasma etch | PSA-5 | 2.5 (64) | 10 (~254) |
| EX-17 | CF-9 | 5 (127) | Plasma etch | PSA-6 | 2.5 (64) | 10 (~254) |
| EX-18 | CF-9 | 5 (127) | Plasma etch | PSA-7 | 2.5 (64) | 10 (~254) |
| EX-19 | CF-9 | 5 (127) | Plasma etch | PSA-8 | 2.5 (64) | 10 (~254) |
| EX-20 | CF-9 | 5 (127) | Plasma etch | PSA-9 | 2.5 (64) | 10 (~254) |
| EX-21 | CF-9 | 5 (127) | Plasma etch | PSA-10 | 2.5 (64) | 10 (~254) |
| EX-22 | CF-9 | 5 (127) | Plasma etch | PSA-11 | 2.5 (64) | 10 (~254) |
| EX-23 | CF-9 | 5 (127) | Plasma etch | PSA-12 | 2.5 (64) | 10 (~254) |
| CE-A | PET | 5 (127) | Plasma etch | PSA-1 | 2.0 (51) | 10 (~254) |
| CE-B | PET | 0.5 (~13) | Plasma etch | PSA-4 | 5.0 (127) | 10.5 (~267) |

TABLE 7

| | Tensile Drop Test, number of drops to failure | | | | | Push Out Test, peak load | | | 70° C. Anti-Repulsion | | | |
|---|---|---|---|---|---|---|---|---|---|---|---|---|
| Example | Run 1, 40 cm | Run 2, 40 cm | Run 1, 70 cm | Run 2, 70 cm | Failure Mode | Run 1, N | Run 2, N | Failure Mode | Lift, mm | Lift, mm | Lift, mm | Failure Mode |
| EX-1 | 20 | 20 | 5 | 1 | 2B | 104 | 99 | cohesive + 2B | | | | |
| EX-2 | 20 | 20 | 3 | 2 | 2B | 101 | 105 | 2B | | | | |
| EX-3 | 20 | 20 | 4 | 2 | PO | 125 | 133 | cohesive + 2B | | | | |
| EX-4 | 20 | 20 | 11 | 8 | PO + 2B | 121 | 134 | cohesive | 2 | 1 | 2 | end split |
| EX-5 | 20 | 20 | 7 | 4 | PO + 2B | 134 | 138 | cohesive | | | | |
| EX-6 | 20 | 20 | 5 | 3 | PO + 2B | 119 | 122 | cohesive | | | | |
| EX-7 | 20 | 20 | 2 | 2 | 2B | 95 | 110 | cohesive | | | | |
| EX-8 | 20 | 20 | 1 | 3 | PO + 2B | 124 | 118 | cohesive | | | | |
| EX-9 | 20 | 20 | 20 | 17 | 2B | 106 | 91 | cohesive + PO | | | | |
| EX-10 | 20 | 20 | 3 | 3 | PO + 2B | 108 | 109 | cohesive | | | | |
| EX-11 | 20 | 20 | 3 | 3 | PO + 2B | 129 | 131 | cohesive + PO | | | | |
| EX-12 | 20 | 20 | 6 | 8 | PO | 100 | 108 | PO | | | | |
| EX-13 | 20 | 20 | 8 | 2 | PO + 2B | 129 | 116 | cohesive + PO | | | | |
| EX-14 | 16 | 20 | | 5 | PO + 2B + core split | 123 | 123 | core split + cohesive + PO | | | | |
| EX-15 | 20 | 20 | 10 | 4 | core split | 129 | 128 | core split + cohesive + PO | | | | |
| EX-16 | 14 | 20 | | | PO + 2B | 91 | 99 | PO + 2B | | | | |
| EX-17 | 3 | 5 | | | PO + 2B | 96 | 88 | PO + 2B | | | | |

TABLE 7

| Example | Tensile Drop Test, number of drops to failure | | | | | Push Out Test, peak load | | | 70° C. Anti-Repulsion | | | |
|---|---|---|---|---|---|---|---|---|---|---|---|---|
| | Run 1, 40 cm | Run 2, 40 cm | Run 1, 70 cm | Run 2, 70 cm | Failure Mode | Run 1, N | Run 2, N | Failure Mode | Lift, mm | Lift, mm | Lift, mm | Failure Mode |
| EX-18 | 5 | 8 | | | PO + 2B | 121 | 109 | 2B | | | | |
| EX-19 | 5 | 4 | 3 | 6 | 2B | 135 | 145 | 2B | | | | |
| EX-20 | 20 | 20 | 11 | 1 | 2B | 123 | 123 | 2B | | | | |
| EX-21 | 20 | 20 | 4 | 3 | PO + 2B | 145 | 134 | 2B | | | | |
| EX-22 | 20 | 20 | | | 2B | 156 | 153 | 2B | | | | |
| EX-23 | 8 | 11 | | | PO + 2B | 177 | 159 | 2B | | | | |
| CE-A | 2 | 1 | | | PO | 97 | 108 | cohesive | | | | |
| CE-B | 1 | 14 | | | PO | 72 | 80 | PO | | | | |
| CE-C | 7 | 3 | 1 | | PO/cohesive | 123 | 124 | cohesive + PO | 48 | 50 | 48 | PO |
| CE-D | 17 | 10 | | | PO | 82 | 80 | PO + 2B | | | | |
| CE-E | 12 | 9 | | | 2B | 163 | 162 | PO | 1 | 1 | | |
| CE-F | 3 | 2 | | | foam split | 124 | 117 | foam split | 0 | 0 | | |

Comparative Example C was TESA 61395.
Comparative Example D was TESA 61725.
Comparative Example E was Sekisui 5225VCB.
Comparative Example F was Sekisui 5220PSB.

Comparative Examples CE-A and CE-B were made by laminating both sides of PET carrier film with PSA, either by hand or through a laminator, according to the combinations summarized in Table 6. The laminated sheets were left at room temperature overnight before sample preparation for testing. Comparative Examples CE-C to CE-F were commercially available double coated tapes.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. Furthermore, all publications, published patent applications and issued patents referenced herein are incorporated by reference in their entirety to the same extent as if each individual publication or patent was specifically and individually indicated to be incorporated by reference. Various exemplary embodiments have been described. These and other embodiments are within the scope of the following listing of disclosed embodiments.

The invention claimed is:

1. A double-coated tape comprising, in the following order:
   a first pressure-sensitive adhesive layer;
   a first plastic skin layer comprising carbon black and an ethylene-vinyl acetate copolymer, and having an average thickness ranging from 10 micrometers to 50 micrometers;
   an elastic base layer having an average thickness ranging from 20 micrometers to about 130 micrometers; wherein the elastic base layer comprises an elastomer selected from the group consisting of styrenic block copolymers, olefinic block copolymers, thermoplastic polyolefins, natural rubber, styrene butadiene rubber, ethylene propylene diene monomer, polyisobutylene, thermoplastic polyurethanes, and blends and copolymers thereof;
   a second plastic skin layer comprising carbon black and an ethylene-vinyl acetate copolymer; and
   a second pressure-sensitive adhesive layer, wherein the first pressure-sensitive adhesive layer and the second pressure-sensitive adhesive layer are outermost layers on either side of the double-coated tape;
   wherein each of the first and second plastic skin layers has an average thickness of at least 10 percent to at most 50 percent of the average thickness of the elastic base layer;
   wherein the double-coated tape:
   has an overall thickness ranging from 50 micrometers to 400 micrometers; and
   withstands at least 15 drops according to the procedure Tensile Drop Test-Room Temperature Conditioning described in the present Specification.

2. The double-coated tape of claim 1, wherein the elastic base layer comprises the elastomer selected from the styrenic block copolymers.

3. The double-coated tape of claim 1, wherein the elastic base layer comprises, in the following order:
   a first elastic film;
   a foam core; and
   a second elastic film.

4. The double-coated tape of claim 3, wherein the foam core accounts for 1 percent to 50 percent of the average thickness of the elastic base layer.

5. The double-coated tape of claim 1, wherein each of the first and second plastic skin layers has an average thickness ranging from 10 micrometers to 50 micrometers.

6. The double-coated tape of claim 1, wherein each of the first and second plastic skin layers has an average thickness ranging from 25 percent to 35 percent of the average thickness of the elastic base layer.

7. The double-coated tape of claim 1, wherein one or both of the first and second pressure-sensitive adhesive layers comprise one or more fillers.

8. The double-coated tape of claim 1, wherein the double-coated tape withstands at least 20 drops according to the procedure Tensile Drop Test-Room Temperature Conditioning described in the present Specification.

9. The double-coated tape of claim 1, wherein the double-coated tape yields a push-out force of at least 90 Newtons according to the procedure Push-Out Test described in the present Specification.

10. A device assembly using the double-coated tape claim 1, comprising:
- a transparent lens;
- a substrate; and
- the double-coated tape, wherein the double-coated tape adhesively couples the transparent lens and the substrate to each other.

11. A method of making the double-coated tape of claim 1, comprising:
- coextruding first and second plastic skin resins and an elastic base resin through a die to form a carrier film comprising the first plastic skin layer, the elastic base layer, and the second plastic skin layer; and
- laminating the first and second pressure-sensitive adhesive layers to opposing major surfaces of the carrier film to obtain the double-coated tape.

12. The method of claim 11, further comprising surface functionalizing one or both opposing major surfaces of the carrier film by plasma treatment prior to laminating the first and second pressure-sensitive adhesive layers.

13. The double-coated tape of claim 2, wherein the elastic base layer comprises, in the following order:
- a first elastic film;
- a foam core; and
- a second elastic film.

14. The double-coated tape of claim 13, wherein the foam core accounts for 1 percent to 50 percent of the average thickness of the elastic base layer.

15. The double-coated tape of claim 1, wherein the first plastic skin layer comprises an acid/acrylate-modified ethylene-vinyl acetate copolymer and the second plastic skin layer comprises an acid/acrylate-modified ethylene-vinyl acetate copolymer.

16. The double-coated tape of claim 1, wherein the first plastic skin layer comprises 98 weight percent ethylene-vinyl acetate copolymer and the second plastic skin layer comprises 98 weight percent ethylene-vinyl acetate copolymer.

17. The double-coated tape of claim 1, wherein the first and second plastic skin layers comprise surface modification formed by corona discharge treatment, plasma discharge treatment, flame treatment, electron beam irradiation, ultraviolet radiation or coating with a stable primer.

18. The double-coated tape of claim 1, wherein each of the first and second pressure-sensitive adhesive layers comprises an acrylic pressure-sensitive adhesive.

19. The double-coated tape of claim 18, wherein each acrylic pressure-sensitive adhesive comprises a tackifier.

* * * * *